United States Patent [19]
Pantus

[11] Patent Number: 4,647,913
[45] Date of Patent: Mar. 3, 1987

[54] SELF-DIAGNOSTIC ULTRASONIC INTRUSION DETECTION SYSTEM

[75] Inventor: Math M. J. Pantus, Brunssum, Netherlands

[73] Assignee: American District Telegraph Company, New York, N.Y.

[21] Appl. No.: 691,548

[22] Filed: Jan. 15, 1985

[51] Int. Cl.⁴ .......................... G08B 29/00; G01S 9/66

[52] U.S. Cl. .................................... 340/506; 340/507; 340/510; 340/514; 340/653; 340/554; 340/522; 367/94

[58] Field of Search ............... 340/522, 521, 507, 506, 340/537, 551-554, 561-563, 565-567, 653, 657, 510, 511, 514; 367/93, 94

[56] References Cited

U.S. PATENT DOCUMENTS

| | | | |
|---|---|---|---|
| 3,665,443 | 5/1972 | Galvin | 340/522 |
| 3,760,400 | 9/1973 | Galvin et al. | 340/522 |
| 3,801,978 | 4/1974 | Gershberg et al. | 367/94 |
| 3,932,870 | 1/1976 | Shapiro et al. | 367/94 |
| 4,079,363 | 3/1978 | Wilson, Jr. | 340/276 |
| 4,482,889 | 11/1984 | Tsuda et al. | 367/94 |
| 4,541,080 | 9/1985 | Kodaira | 367/94 |

FOREIGN PATENT DOCUMENTS

| | | |
|---|---|---|
| 0098326 | 1/1984 | European Pat. Off. . |
| 2257931 | 6/1974 | Fed. Rep. of Germany . |

*Primary Examiner*—Donnie L. Crosland
*Attorney, Agent, or Firm*—Weingarten, Schurgin, Gagnebin & Hayes

[57] ABSTRACT

A self-diagnostic ultrasonic motion detection system includes an ultrasonic transceiver operative in a transmit mode and in a receive mode. In normal operation, the ultrasonic transceiver in its transmit mode has a characteristic electrical impedance. Potential electromechanical, electrical, acoustical, and other sources of false and failure of alarm situations manifest as changes in the electrical impedance of the transceiver in its transmit mode. The electrical impedance is monitored, changes from the nominal are detected, and a suitable self-diagnostic alarm signal is produced in response thereto.

12 Claims, 12 Drawing Figures

SELF-DIAGNOSTIC ULTRASONIC INTRUSION DETECTION SYSTEM

FIELD OF THE INVENTION

This invention is directed to the field of intrusion detection systems, and more particularly, to a novel self-diagnostic ultrasonic detection system.

BACKGROUND OF THE INVENTION

Ultrasonic intrusion detection systems typically transmit ultrasonic energy into a region to be protected and detect intruder presence induced Doppler-shifted ultrasonic energy received therefrom to provide an alarm signal indication of unauthorized intruder presence. Transmission and reception is typically accomplished by ultrasonic transceivers that have electromechanical components commonly including vibrating membranes, piezoelectic crystals, and housing mounting members. The physical integrity and therewith the performance of such components tends to deteriorate with age, and often in such a way that produces failure and/or false alarm situations if allowed to develop undetected and unchecked.

Typical electrical components for the transceivers include a crystal oscillator and intruder presence detection circuitry that are usually electrically interconnected to the transceivers by elongated wires. Vibration, solder contact deterioration, and other factors often so disturb the electrical wires from their intended interconnection points as to produce undesireable open-circuit conditions in the transceiver feed and receive paths as well as to produce undesireable electrical short circuit paths in the transceivers and associated electronic detection circuitry.

Another source of false and failure of alarm situations for ultrasonic intrusion detection systems is undetected and uncompensated changes from nominal in the atmospheric conditions of the sound propagation medium. Excessive pollution, extreme temperature changes, and atmospheric pressure changes, among others, may so alter the acoustic propagation medium that the actual system range either over-extends or under-extends the nominal range thereby occassioning false alarm situations and failure of alarm situations.

A further impediment to the utility of ultrasonic motion detection systems is presented by the ability of objects located in the nearfield of the transceivers to prevent energy transmission and reception in such a way as to effectively circumvent intruder motion detection. Such an event could occur, for example, by an intruder who gains access to the location of the ultrasonic transceivers and places an object in the radiative path thereof as by cupping it over by hand.

SUMMARY OF THE INVENTION

The self-diagnostic ultrasonic motion detection system of the present invention overcomes these and other disadvantages by detecting potential sources of mechanical, electrical, and acoustical failure and false alarm situations, and alarming in response thereto so that suitable corrective measures can be taken.

In general terms, the present invention is based on the recognition that the electrical impedance of the transmitting transceiver has a nominal range of values in normal operation, which makes possible the detection of potential mechanically, electrically, and acoustically induced false and failure of alarm situations by detecting the occurance of out-of-bounds magnitudes of the electrical impedance. In this way, it has been found that a system constructed in accordance with the invention is able to detect and alarm for such potential electromechanical error sources as degraded vibrating membranes, piezoelectric crystals, and housing defects, such potential electrical error sources as electrically open and short circuit conditions, and such potential acoustical error sources as temperature, pressure, and pollutant changes in the atmospheric propagation medium as well as masking attempts in the transceiver nearfield.

In a presently preferred embodiment, the self-diagnostic ultrasonic motion detection system of the present invention includes an ultrasonic motion detection subsystem having first and second ultrasonic transceivers for alternately and sequentially transmitting ultrasonic energy into and for receiving ultrasonic energy from the protected space, and signal processing circuitry operatively connected thereto for detecting Doppler-shifted components of the received ultrasonic energy and to provide a signal indication of unauthorized intruder presence in response thereto. Means coupled to the ultrasonic transceiver are disclosed operative to provide a signal having a level representative of the electrical impedance of the transmitting transceiver. Means are disclosed operative in response to the level of the signal representative of the electrical impedance of the transmitting transceiver to provide such self-diagnostic alarm signals as transceiver mechanical failure, electrical circuitry failure, abnormal acoustical characteristics of the propagation medium, and a possible transceiver masking attempt. The signal representative of the electrical impedance of the disclosed transmitting transceiver has both D.C. and A.C. signal components, and the self-diagnostic alarm signal providing means is operative in response to the levels of both the D.C. and A.C. signal components for providing the self-diagnostic alarm signals. The A.C. signal components represent potential error sources produced by differential conditions that exist both between the two transceivers and that exist at each of the transceivers severally.

BRIEF DESCRIPTION OF THE DRAWINGS

Other advantages and attendant features of the present invention will become apparent as the invention becomes better understood by referring to the following solely exemplary and non-limiting detailed desctiption of a preferred embodiment thereof, and to the drawings, wherein.

DETAILED DESCRIPTION OF THE PREFERRED EMBODIMENT

Figure 1:
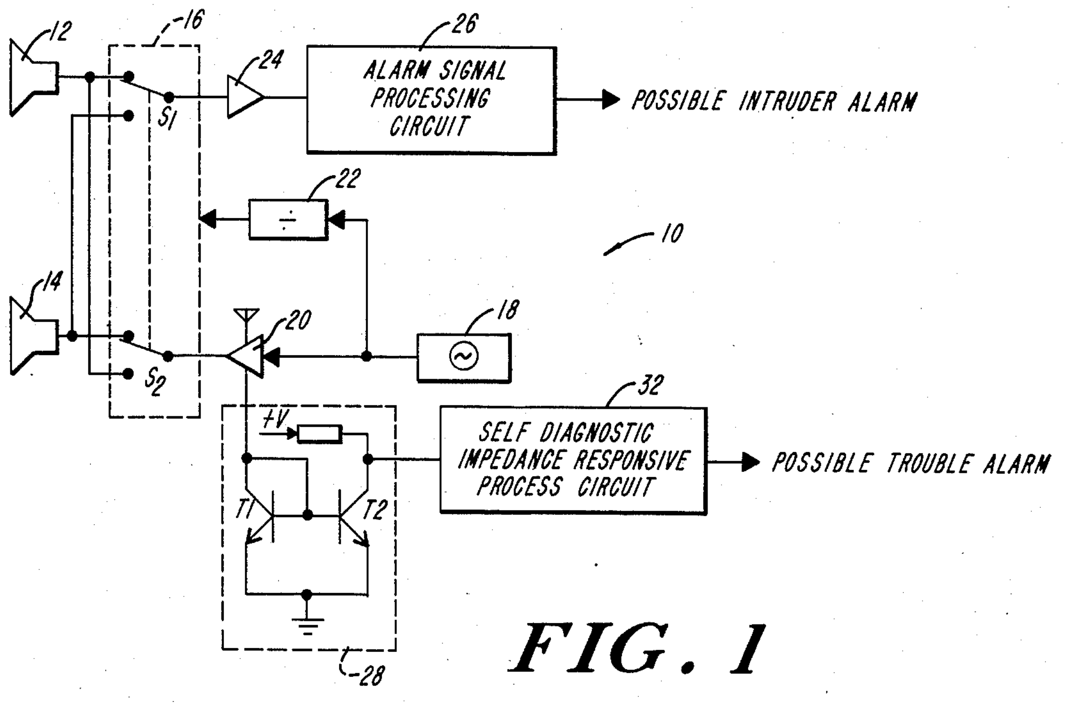
FIG. 1 is a block diagram of the novel self-diagnostic ultrasonic motion detection system according to the present invention.

Referring now to FIG. 1, generally designated at 10 is a block diagram of the self-diagnostic ultrasonic motion detection system according to the present invention. The system 10 includes a first ultrasonic transceiver 12 and a second spaced ultrasonic transceiver 14 both confronting a space to be protected. A multiplexer schematically illustrated by a dashed box 16 is operatively connected to the transceivers 12, 14. An oscillator 18 is connected through an oscillator amplifier 20 to a signal input of the multiplexer 16. A frequency divider 22 is connected between a switching frequency control input of the multplexer 16 and the oscillator 18. A preamplifier 24 is connected to a signal output of the multiplexer 16, and an alarm signal processing circuit 26 of known design is connected to the output of the amplifier 24.

The multiplexer 16 in response to the output signal of the frequency divider 22 is operative to repetitively switch the transducers 12, 14 alternately to the oscillator 18 and to the alarm signal processing circuit 26 in such a way that while one transceiver is in its transmit mode the other is in its receive mode, and conversely, as schematically illustrated by switches designated "S1, S2". For example, in the illustrated position of the switches S1, S2 of the multiplexer 16, the transceiver 12 is operative as an ultrasonic receiver and is operatively connected through the amplifier 24 to the alarm signal processing circuitry 26, while the transceiver 14 is operative as an ultrasonic transmitter and is operatively connected to the oscillator 18 through the amplifier 20. For the next cycle of the switching signal to be described applied to the control input of the multiplexer 16, the transceiver 12 is operative as an ultrasonic transmitter while the transceiver 14 is operative as an ultrasonic receiver. It will be appreciated that the above process continues synchronously with the output signal of the oscillator 18 as converted through the frequency divider 22.

The alarm signal processing circuitry 26 is responsive to any Doppler-shifted components of the received ultrasonic signal from the tranceivers 12, 14 successively to provide an alarm signal indication of possible intruder motion within the protected space. Reference may be had to U.S. Pat. Nos. 3,665,443, and 3,760,400, assigned to the same assignee as the instant invention and both incorporated herein by reference, for exemplary alarm signal processing circuitry.

Each of the transceivers 12, 14 in its transmitting mode has a characteristic electrical impedance having values that fall within a nominal range of values in normal operation. Such factors as pollutants and/or excessive pressure and temperature changes in the acoustic propagation medium, as well as masking attempts in the nearfield of the transceivers 12, 14, change the acoustic impedance of the propagation medium. Due to the phenomenon of transduction reciprocity, the electrical impedance of the transceivers in the transmit mode therewith changes proportionately. Moreover, such electro-mechanical failure conditions as defective vibrating membranes, piezoelectric crystals, and transducer housing cracks among others, and such electrical failure conditions as open and short circuit conditions, likewise produce detectable changes of the characteristic electrical impedance of the transceivers 12, 14 when operating in their transmit mode. As appears more fully below, the present invention discloses means operative to detect the changes of the characteristic electrical impedances to provide self-diagnostic alarm signals in response thereto.

A circuit illustrated by a dashed box 28 to be described is coupled to the oscillator 18 for providing a signal having a level that is representative of the electrical impedance of the transceivers 12, 14 respectively in their transmitting mode. In the illustrated embodiment, the circuit 28 includes matched transistors T1, T2 operatively connected as a so-called current mirror, with the collector of the transistor T1 connected to an output of the amplifier 20, and with the collector of the transistor T2 connected through a resistor 30 to a source of constant potential designated "+V". A self-diagnostic impedance response processing circuit 32 to be described is connected between the resistor 30 and the collector of the transistor T2.

For a given preselected constant operating drive voltage for the transceivers 12, 14, any acoustically, mechanically, or electrically induced changes in the electrical impedance of the transceivers in their transmitting mode produce correspondingly different currents into the collector of the transistor T1. Since the current through the collector of the transistor T2 mirrors the current through the collector of the transistor T1, and since the voltage dropped through the resistor 30 depends on the current through the transistor T2, a voltage signal having a level representative of the electrical inpedance of the transceivers 12, 14 in the transmitting mode is thereby applied to the impedance responsive processing circuit 32. The self-diagnostic impedance responsive processing circuit 32 is operative to detect whether the voltage signal representative of the electrical impedance of the transceivers in the transmitting mode is within prescribed D.C. and A.C. bounds to be described, and to produce self-diagnostic alarm signals for out-of-bound conditions indicative of potential mechanical, electrical, acoustical, and other sources of failure and false alarm situatios.

Figure 2:
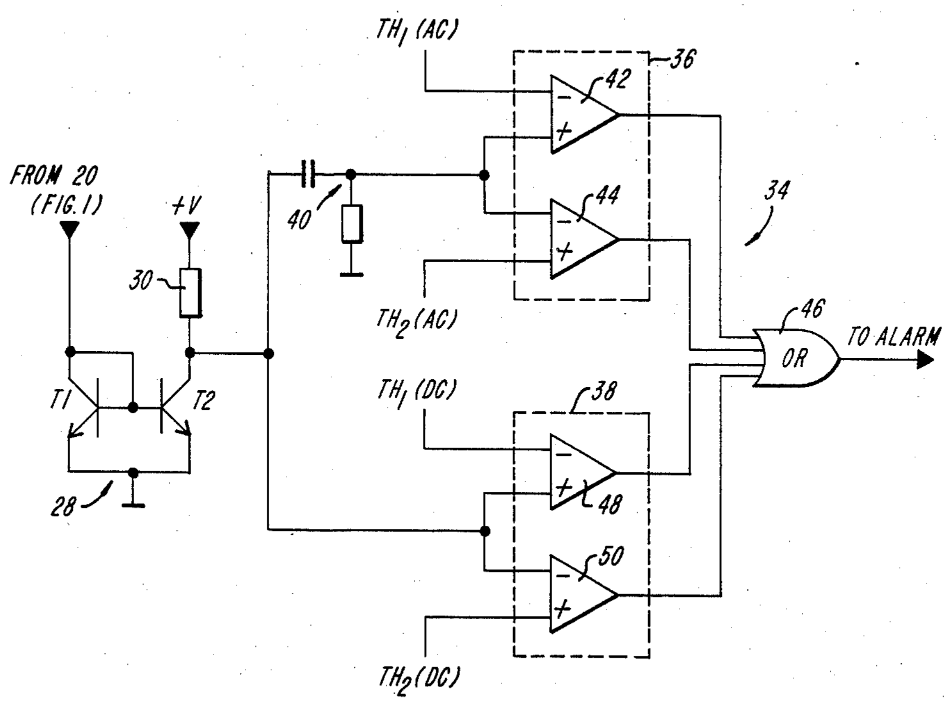
FIG. 2 is schematic diagram of a portion of the self-diagnostic ultrasonic motion detection system according to the present invention.

Referring now to FIG. 2, generally desingated at 34 is a schematic diagram of an exemplary embodiment of the self-diagnostic impedance responsive processing circuit of the self-diagnostic ultrasonic motion detection system according to the present invention. The signal having a voltage that represents the acoustical impedance of the transceivers 12, 14 (FIG. 1) in the transmitting mode is connected on parallel circuit legs to an A.C. window comparator illustrated by a dashed box 36 to be described, and to a DC window comparator illustrated by a dashed box 38 to be described. A resistor and capacitor network generally designated 40 is connected in the circuit path of the AC window comparator 36 that is operative to block the D.C. components of the voltage signal while to pass the A.C. components thereof.

The A.C. window comparator 36 includes dual comparators 42, 44 each having an input designated "+", and an input designated ∓−", operatively connected in a parallel arrangement to the output of the network 40. The input designated "−" of the comparator 42 is connected to a preselected alternating current first threshold level designated "$TH_1(AC)$", and the input designated "+" of the comparator 44 is connected to a preselected alternating current second threshold level designated "$TH_2(AC)$". The preselected thresholds of the comparators 42, 44 are selected to define the upper boundary and the lower boundary of an alternating current window for detecting out-of-bounds levels of the A.C. component of the voltage signal representative of the electrical impedance of the transceivers 12, 14 in their transmitting mode. The output of the comparators 42, 44 is connected to an OR gate 46. Whenever the alternating current components of the voltage signal exceed the nominal bounds established by the thresholds of the comparators 42, 44, the corresponding comparator is operative to produce an output signal which is passed through the OR gate 46 to indicate and out-of-bounds alarm condition.

The DC window comparator 38 includes dual comparators 48, 50 having an input designated "+" and an input designated "−" operatively connected in a parallel circuit arrangement, with the output of each of the comparators 48, 50 connected to the OR gate 46, and with preselected inputs thereof connected to the voltage having a signal level representative of the electrical inpedance of the transceivers in their transmitting mode. The input designated "−" of the comparator 48 is connected to a preselected direct current first threshold level designated "$TH_1(DC)$", and the input designated "+" of the comparator 50 is connected to a preselected direct current second threshold level designated "$TH_2(DC)$". The preselected thresholds of the comparators 48, 50 are selected to define the upper boundary and the lower boundary of a direct current window for detecting out-of-bounds levels of the D.C. components of the signal representative of electrical impedance of the transceivers 12, 14 in their transmitting mode. The comparators 48, 50 are operative in response to out-of-bounds D.C. signal component levels to produce output signals that enable the OR gate 46, and therewith provide an alarm signal indication of the out-of-bounds conditions.

Figure 3A:
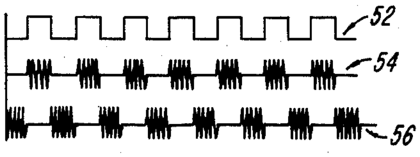
FIGS. 3A through 3J illustrates not-to-scale waveforms useful in illustrating the operation of the self-diagnostic ultrasonic motion detection system according to the present invention.

Referring now to FIG. 3A, generally designated at 52 is a waveform illustrating the synchronous multiplexer control signal produced by the divider 22 (FIG. 1). A waveform generally designated 54 illustrates the output of the transceiver 12 in its transmit mode, and a waveform generally designated 56 illustrates the output of the transceiver 14 in its transmit mode. It will be appreciated that the transceivers 12, 14 produce the waveforms 54, 56 as the multiplexer 16 (FIG. 1) controllably switches under control of the waveform 52 applied to the control input thereof.

Figure 3B:
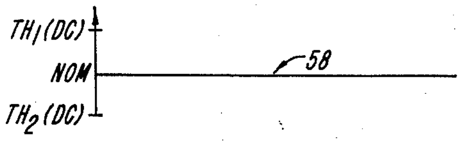

Referring now to FIG. 3B, generally designated at 58 is a waveform illustrating the electrical signal representative of the electrical impedance of the transceivers 12, 14 in their transmit mode in normal operation. In the absence of any potential sources of mechanically, electrically, or acoustically induced failure and false alarm situations, the signal representative of acoustical impedance has a nominal D.C. voltage level designated "$V_{nom}$", and no significant A.C. component. The nominal voltage level is well within the window defined by the preselected direct current levels "$TH_1(DC)$, $TH_2(DC)$", and thus neither of the comparators 48, 50 (FIG. 2) nor the OR gate 46 is enabled. No alarm signal indication is produced in this case.

Figure 3C:
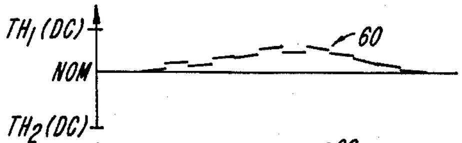

Referring now to FIG. 3C, generally designated at 60 is a waveform illustrating the electrical signal representative of the electrical impedance of the transceivers 12, 14 in their transmit mode in the way it varies with day-to-day differences in air density, temperature, and other such factors. The magnitude of the waveform 60 is everywhere within the thresholds of the direct current window comparator 38 (FIG. 2). The comparator 38 thereby remains disabled, and no output alarm indication is produced. No significant A.C. signal components are produced since the day-to-day differences in air density and the like affect both of the transceivers 12, 14 (FIG. 1) in the same manner.

Figure 3D:
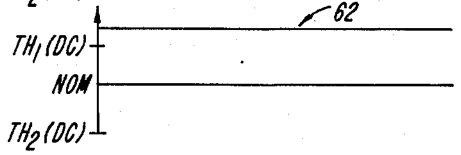

Referring now to FIG. 3D, generally designated at 62 is a waveform illustrating the electrical impedance of the transceivers 12, 14 in their transmitting mode for such electrical failure conditions as both of the ultrasonic transceivers 12, 14 (FIG. 1) being in an open circuit condition such as, for example when no oscillator signal is being produced by the oscillator 18 (FIG. 1). The waveform 62 may also illustrate such mechanical sources of failure as a damaged crystal oscillator, and may also illustrate such acoustical error conditions as no air pressure in the nearfield of the ultrasonic transceivers. For these and other similar cases, no current signal is produced through the current mirror 28 (FIG. 1) so that all of the voltage designated "V" appears as the input to the self-diagnostic impedance responsive processing circuit. The signal level is well beyond the thresholds of the direct current window comparator 28 (FIG. 2) so that the OR gate 46 (FIG. 2) is enabled, and the system is operative to produce an alarm signal indication.

Figure 3E:
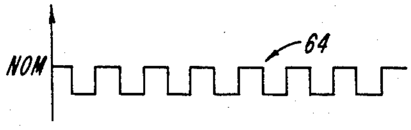

Referring now to FIG. 3E, generally designated at 64 is a waveform illustrating an event detectable by the alternating current window comparator 38 (FIG. 2) whenever there exists differential electrical impedances between the ultrasonic transceivers 12, 14 (FIG. 1) produced in their respective transmit modes. The waveform 64 may be produced, for example, from such potential acoustical error sources as excessive pollution in the propagation medium of the transceiver 12 but not for the transceiver 14, such potential mechanical error sources as a defective vibrating membrane, piezoelectric crystal, or one or more housing defects of the ultrasonic transceiver 12 but not for the transceiver 14, and for such atmospheric sources of error as vapor condensation on the face of the ultrasonic transceiver 12 but not on the ultrasonic transceiver 14. For these and similar cases, the signal 64 having a level representative of the electrical impedance of the transceivers 12, 14 differentially varies, producing an alternating current signal component having levels, not shown, out of the bounds of the alternating current window comparator 36 (FIG. 2) after it passes through the network 40 (FIG. 2). The A.C. comparator is responsive to the out-of-bounds condition to enable the OR gate 46, and therewith an alarm signal indication is produced.

Figure 3F:
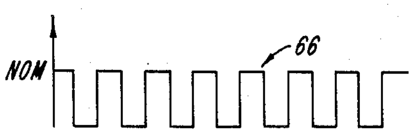

Referring now to FIG. 3F, generally designated at 66 is a waveform illustrating the electrical impedance signal of the ultrasonic transceivers 12, 14 in their transmitting mode for the case where the ultrasonic transceiver 12 is in a short-circuit condition but not the transceiver 14. For this case, the current mirror 28 (FIG. 1) produces a maximum current and in such a way that the voltage applied to the self-diagnostic impedance responsive processing circuit 32 (FIG. 1) is equal to the saturation voltage of the collector to emitter junction of the transistor T2. After passing through the network 40 (FIG. 2), the waveform 66 has a signal characteristic, not shown, that exceeds the alternating current window defined by the alternating current window comparator 36 (FIG. 2), the OR gate 46 is enabled, and an alarm signal indication is produced. It will be appreciated that a similar phenomena occurs for a short-circuit condition for the ultrasonic transceiver 14, but not for the transceiver 12, not illustrated.

Figure 3G:
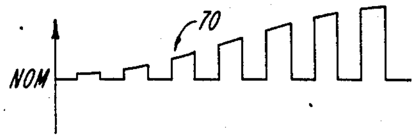

Referring now to FIG. 3G, generally designated at 70 is a waveform illustrating the signal having a level representative of the electrical impedance of the ultrasonic transceivers 12, 14 in the transmit mode that results whenever the ultrasonic transceiver 12 but not the transceiver 14 deteriorates due to aging and the like. Aging and other similar phenomena of one of the transceivers 12, 14 but not of the other one of the transceivers in their transmit mode produce differential electrical impedances, which are detected by the alternating current window comparator after passing through the network 40 (FIG. 2), not shown, as the impedances thereby produced exceed the predetermined thresholds therefor, and an alarm signal indication is provided.

Figure 3H:
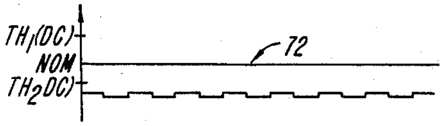

Referring no to FIG. 3H, generally designated at 72 is a waveform illustrating the signal having a level representative of the electrical impedance of the ultrasonic transceivers 12, 14 in their transmit modes for the case where both of the transceivers have out-of-bounds electrical impedances due to such environmental error sources as excessive temperature or pressure conditions and/or excessive pollution of the propagation paths of both of the ultrasonic transceivers 12, 14 simultaneoulsy. The electrical signal 72 is detected by the direct current window comparator 38 (FIG. 2), and an alarm signal indication is produced.

Figure 3I:
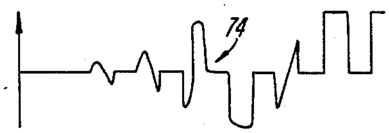
Figure 3J:
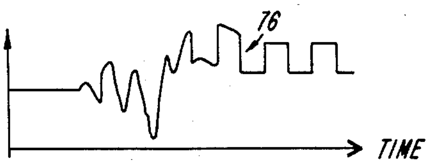

Referring now to FIGS. 3I and 3J, generally designated at 74 in FIG. 3I is a waveform having a level representative of the electrical impedance of the transceivers 12, 14 in their transmit mode when one of the transceivers is being masked, and generally designated at 76 in FIG. 3J is a corresponding waveform illustrating the signal when of the transceivers 12, 14 are both being masked. The masking attempts of either or both of the ultrasonic transceivers 12, 14 produces alternating current components, not shown, detectable by the alternating current comparator after passing through the network 40 (FIG. 2) of the self-diagnostic impedance responsive signal processing circuit, which therewith produces an alarm signal indication thereof.

It will be appreciated that many modifications of the presently disclosed invention will become apparent to those skilled in the art without departing from the scope of the appended claims.

What is claimed is:

1. A self-diagnostic ultrasonic motion detection system, comprising:

a first ultrasonic transceiver;

a second ultrasonic transceiver;

a frequency source;

an ultrasonic detector;

first means coupled to the first transceiver, to the second transceiver, to the frequency source, and to the ultrasonic detector for electrically connecting the first transceiver and the second transceiver individually alternately to the frequency source for energization and to the ultrasonic detector in such a way that when the first transceiver is connected to the frequency source the second transceiver is connected to the ultrasonic detector, and vice versa;

second means coupled to the first means for providing an electrical signal having an identifiable characteristic representative of electrical impedance of corresponding ones of the first and second transceivers when they are individually connected to and energized by the frequency source; and third means coupled to the second means for providing a self-diagnostic alarm signal in response to whether or not the identifiable characteristic of the electrical signal meets predetermined nominal characteristics.

2. The invention of claim 1, wherein said first means includes a multiplexer.

3. The invention of claim 2, wherein said multiplexer is operatively connected to said frequency source for controlling its switching action.

4. The invention of claim 1, wherein said second means includes a current mirror for providing a current signal whose magnitude is proportional to the electrical impedance of corresponding ones of the first and second transducers when they are individually connected to the frequency source.

5. The invention of claim 4, wherein said second means further includes means responsive to the current signal to provide a signal having a voltage level proportional to the current level and representative of the electrical impedance of the first and second transceivers when they are individually connected to the frequency source.

6. The invention of claim 5, wherein said third means includes a voltage comparator having preselected thresholds responsive to the signal having a voltage and operative to produce a self-diagnostic alarm signal in response to the voltage level exceeding the preselected thresholds.

7. The invention of claim 1, wherein the electrical signal representative of the electrical impedance of corresponding ones the first and second transceivers when they are individually connected to the frequency source has direct current components, and wherein said third means includes a direct current window comparator having preselected direct current thresholds responsive to the direct current components for providing the self-diagnostic alarm signal in response to whether or not the direct current components exceed the preselected direct current thresholds.

8. The invention of claim 1, wherein the electrical signal representative of the electrical impedance of corresponding ones of the first and second transceivers when they are individually connected to the frequency source has alternating current components, and wherein said third means includes an alternating current window comparator having preselected alternating current thresholds operative in response to the alternating current components of the electrical signal to provide said self-diagnostic signal whenever the alternating current components exceed the alternating current thresholds of the alternating current comparator.

9. A self-diagnostic ultrasonic motion detection system, comprising:

an ultrasonic detection sub-system, including an operating ultrasonic transmitter that is in an energized condition, that is subject to electro-mechanically, electrically, and acoustically arising sub-system detection errors caused by electro-mechanical, electrical, and acoustical anomalies potentially present in and around the ultrasonic detection sub-system;

means coupled to the ultrasonic detection sub-system for providing an electrical signal representative of the impedance of the ultrasonic transmitter in its energized condition; and means operative in response to the electrical signal for providing a self-diagnostic alarm signal indication of the potential presence of electro-mechanical, electrical, and acoustical anomalies in and around the ultrasonic detection sub-system so that suitable measures may be taken to eliminate the corresponding electro-mechanically, electrically, and acoustically caused detection errors.

10. The invention of claim 9, wherein said electrical signal has a DC component; and wherein said alarm-signal providing means is responsive to said DC component of the electrical signal representative of the impedance of the ultrasonic transducer.

11. The invention of claim 9, wherein said electrical signal representative of the impedance of the ultrasonic transmitter has an alternating current component, and wherein the alarm signal providing means is responsive to the alternating current component of the electrical signal representative of the impedance of the ultrasonic transducer.

12. The invention of claim 9, wherein said electrical signal representative of the impedance of the ultrasonic transmitter is a voltage having values representative thereof.

* * * * *